United States Patent
Holgerson et al.

(10) Patent No.: US 12,127,519 B2
(45) Date of Patent: Oct. 29, 2024

(54) GREENHOUSE SCREEN

(71) Applicant: AB Ludvig Svensson, Kinna (SE)

(72) Inventors: Per Holgerson, Brämhult (SE); Sara Widén, Borås (SE)

(73) Assignee: AB LUDVIG SVENSSON, Kinna (SE)

( * ) Notice: Subject to any disclaimer, the term of this patent is extended or adjusted under 35 U.S.C. 154(b) by 217 days.

(21) Appl. No.: 16/607,138

(22) PCT Filed: Jul. 16, 2018

(86) PCT No.: PCT/EP2018/069235
§ 371 (c)(1),
(2) Date: Oct. 22, 2019

(87) PCT Pub. No.: WO2019/016125
PCT Pub. Date: Jan. 24, 2019

(65) Prior Publication Data
US 2021/0259162 A1   Aug. 26, 2021

(30) Foreign Application Priority Data

Jul. 17, 2017  (SE) .................................. 1750941-5
Nov. 2, 2017  (SE) .................................. 1751362-3

(51) Int. Cl.
*A01G 9/22*   (2006.01)
*A01G 9/14*   (2006.01)
(Continued)

(52) U.S. Cl.
CPC .............. *A01G 9/22* (2013.01); *D03D 15/60* (2021.01); *D04B 21/165* (2013.01);
(Continued)

(58) Field of Classification Search
CPC .............. A01G 9/22; A01G 2009/1453; A01G 2009/1461; D03D 15/60; D03D 15/00;
(Continued)

(56) References Cited

U.S. PATENT DOCUMENTS 4,399,671 A   8/1983  Henningsson
6,441,059 B1  8/2002  Kieser et al.
(Continued)

FOREIGN PATENT DOCUMENTS

BR           9307026 A    6/1999
BR       PI 0701844 A2   11/2008
(Continued)

OTHER PUBLICATIONS

Machine Translation of Akira et al. (JP H10327684 A) from Espacenet.com. (Year: 1998).*
(Continued)

*Primary Examiner* — Jenna N Chandhok
(74) *Attorney, Agent, or Firm* — Ballard Spahr LLP

(57) ABSTRACT

A greenhouse screen is described with strips of film material that are interconnected by a yarn system of transverse threads and longitudinal threads by means of knitting, warp-knitting or weaving process to form a continuous product is disclosed. At least some of the strips include a film material in the form of a single- or multilayer polyethylene film having a thickness of 10-70 micrometers. Said film has at least 2-4 wt.-% $SiO_2$ particles having a $D_{50}$ of 2-10 micrometers. The film is advantageously used as a screen providing light scattering properties particularly suited for greenhouse applications.

20 Claims, 3 Drawing Sheets

(51) Int. Cl.
*D03D 15/60* (2021.01)
*D04B 21/16* (2006.01)

(52) U.S. Cl.
CPC ............... *A01G 2009/1453* (2013.01); *A01G 2009/1461* (2013.01); *D10B 2321/021* (2013.01); *D10B 2401/20* (2013.01); *D10B 2505/18* (2013.01); *Y10T 442/3114* (2015.04); *Y10T 442/431* (2015.04); *Y10T 442/463* (2015.04)

(58) Field of Classification Search
CPC ............... D03D 15/62; D10B 2505/18; D10B 2321/021; D10B 2401/20; D04B 21/165; D04B 1/16; D04B 21/16; Y10T 442/3114; Y10T 442/431; Y10T 442/463; Y02A 40/25; Y02A 1/16
See application file for complete search history.

(56) References Cited

U.S. PATENT DOCUMENTS

| | | | |
|---|---|---|---|
| 10,939,624 B2 | 3/2021 | Toye | |
| 2006/0008638 A1 | 1/2006 | Kiehne et al. | |
| 2006/0134382 A1 | 6/2006 | Jesberger et al. | |
| 2011/0171424 A1 | 7/2011 | Kliesch et al. | |
| 2015/0059239 A1* | 3/2015 | Andersson | A01G 9/22 47/21.1 |
| 2015/0173302 A1* | 6/2015 | Duncan | G02B 27/143 359/359 |
| 2017/0208752 A1* | 7/2017 | Lohre | B32B 7/02 |
| 2020/0163284 A1 | 5/2020 | Holgerson et al. | |

FOREIGN PATENT DOCUMENTS

| | | | | |
|---|---|---|---|---|
| CN | 103841820 A | | 6/2014 | |
| CN | 106633295 A | * | 5/2017 | |
| CN | 106976291 B | | 2/2019 | |
| EP | 0030288 A1 | | 6/1981 | |
| EP | 0109951 B1 | | 4/1987 | |
| EP | 0723606 B1 | | 8/1998 | |
| EP | 1095964 A1 | | 5/2001 | |
| EP | 1342824 B1 | | 11/2008 | |
| EP | 2757869 B1 | | 11/2015 | |
| EP | 3196014 A1 | | 7/2017 | |
| EP | 2111099 B1 | | 9/2019 | |
| ES | 439227 A1 | | 2/1977 | |
| FR | 1574088 A | | 7/1969 | |
| FR | 2071064 A5 | | 9/1971 | |
| JP | H10327684 A | * | 12/1998 | ............ A01G 13/02 |
| WO | WO 1996/10107 | | 4/1996 | |
| WO | WO-2008/091192 A1 | | 7/2008 | |
| WO | WO-2013/041524 A1 | | 3/2013 | |
| WO | WO-2017/125575 A1 | | 7/2017 | |

OTHER PUBLICATIONS

LyondellBasel. Hostalen ACP 7740 F2 Product Details from https://www.lyondellbasell.com/en/polymers/p/Hostalen-ACP-7740-F2/a91f7f49-7d0c-4120-b77b-cbeaafa05e24—Screengrab from Wayback Machine (Year: 2016).*

BASF "Plastic Additives for Agricultural Plastics" from https://agriculture.basf.com/global/assets/en/Crop%20Protection/agricultural-films/Agriculture_2016_Final%20(2).pdf (Year: 2016).*

Hatfield "Some of the Important Design Requirements of a Machine Direction Orientor Machine" from https://www.tappi.org/content/events/07place/papers/hatfield.pdf (Year: 2007).*

Harris et al. "How Light Works—Lights as Rays" from https://science.howstuffworks.com/light2.htm (Year: 2021).*

Machine Translation of CN106633295 (Year: 2017).*

International Search Report and Written Opinion were mailed on Sep. 21, 2018 by the International Searching Authority for International Application No. PCT/EP2018/069235, filed on Jul. 16, 2018 and published as WO 2019/016125 on Jan. 24, 2019 (Applicant—AB Ludvig Svensson) (11 Pages).

* cited by examiner

GREENHOUSE SCREEN

CROSS-REFERENCE TO RELATED APPLICATIONS

This application is a U.S. National Phase Application of International Application No. PCT/EP2018/069235, filed Jul. 16, 2018, which claims priority to Swedish Application Nos. 1750941-5, filed Jul. 17, 2017, and 1751362-3, filed Nov. 2, 2017, each of which are hereby incorporated by reference in their entirety.

TECHNICAL FIELD

The present invention refers to a greenhouse screen of the kind comprising a plurality of flexible strips of film, which are interconnected by a yarn framework by means of knitting, warp-knitting or a weaving process to form a continuous product. More specifically the invention refers to a shade screen that scatters the light to create a more homogeneous light distribution inside the greenhouse and a milder climate for the plants.

BACKGROUND OF THE INVENTION

The aim of protected cultivation in greenhouses is primarily to modify the natural environment to increase yield, to improve product quality, to conserve resources, and to extend production areas and crop cycles. Depending on the location of the greenhouse and the crop grown therein, the crop needs to be shaded during the full or parts of the year to avoid harmful stress that will lower the production.

Greenhouse screens are frequently used for energy saving, shading and temperature control. The screens must meet a number of requirements. On the one hand it must let pass the portion of the light needed for plant growth but on the other hand it must block harmful light and the unneeded part which would lead to excessive heating of the greenhouse.

One known type of greenhouse screens comprises a plurality of flexible strips of film material extending in parallel and which by means of a knitting, warp-knitting or weaving process and a yarn system are interconnected to form a continuous product, where the strips form a major part of the surface area of the product. Such a greenhouse screen is known for example through EP 0 109 951. Other examples of screens of this type are shown in FR 2 071 064, EP 1 342 824 and in WO 2008/091192.

The strips of film material can be of selected materials providing desired properties with respect to reflection and light and heat transmission.

A traditional method to provide shading is to apply chalk/whitewash to the cover of the greenhouse. This is a cheap and easy method to apply fixed shading to the greenhouse. An advantage of the chalk is that it diffuses the light passing through it, which gives higher production since more light is reaching the lower leafs of the plant, increasing the photosynthesis. The diffused light also gives a milder climate inside the greenhouse, and on days with strong sunshine it will result in lower head temperature for the plants, preventing stress and production losses as well as quality problems. The main drawback of this method is that it is permanently applied, both in the morning and afternoon when a reduction of light is unwanted, and also on cloudy days.

Some of the above problems are solved by installing a mobile shade screen, which can be retracted when it is not needed. This has made it a standard item in most high end greenhouses, sometimes in combination with whitewash. There are screens that give good light diffusion, but only at very high shade levels.

ES 439227 discloses films for use in greenhouses or growth tunnels as protection from the cold in the night and the heat during the day. The films comprise polyethylene or a copolymer of EVA with less than 15% vinyl acetate and may contain 1-15% natural silicas having a size of 0.1-10 micrometers. The films are 150 micrometers thick and are reported to reduce the transmission of longwave infrared radiation (1450-730 cm-1) i.e. the radiation that is emitted by the soil at night. The infrared light is absorbed by the film in the form of heat and is remitted again inside and outside of the greenhouse or cover resulting in a higher temperature inside the greenhouse at night. The films also have increased turbidity leading to increased diffusion of visible light inside the greenhouse thereby reducing shadows formed inside the greenhouse.

EP1095964 discloses a "thermal" polyoefinic film for use in agriculture such as for greenhouse or ground covering. The film is intended t reduce the risk of damage due to frosts when there is no heating inside the greenhouse. The film comprises a low density polyethylene, a borate compound or anhydrous borax together with a silica, silicate, carbonate or sulfate compound as additives. Films having a thickness of 200 micrometers and comprising 1-15% silica with a particle size of 1-10 micrometers together with a zinc borate compound. Example 4 discloses a LDPE film having a thickness of 200 micrometers comprising 5.1% of silica giving a 89.7% transmission of light.

Thus, there is a need for a mobile shade screen that gives high transparency to visible light while at the same time providing good light diffusion to create a more homogeneous light distribution inside the greenhouse.

SUMMARY OF THE INVENTION

An object of the present invention is to provide a greenhouse screen that scatters the light to create a more homogeneous light distribution inside the greenhouse and thereby a milder climate for the plants. A further goal is to produce a screen which has low manufacturing costs (i.e. few ingredients and a low production cost) and which if required can be produced in small, as well as in large batches. Furthermore it is important that the screen has a lifetime for at least a couple of years before having to be replaced.

This is provided by a greenhouse screen comprising strips of film material that are interconnected by a yarn system of transverse and longitudinal threads by means of a knitting, warp-knitting or weaving process to form a continuous product, wherein at least some of the strips comprise a film in the form of a single- or multilayer polyethylene (PE) film with a thickness of 10-70 micrometers, said film comprising at least 1.7 wt.-% and a maximum of 4.5 wt.-% $SiO_2$ particles having a $D_{50}$ of 2-10 micrometers.

The greenhouse screen comprises a plurality of narrow strips of film material held together by a yarn framework. The strips of film material are preferably arranged closely edge to edge, so that they form a substantially continuous surface. The screen has a longitudinal direction y, and a transverse direction x, wherein the strips of film material extend in the longitudinal direction. In some embodiments strips of film material may extend also in the transverse direction. A typical width of the strips is between 2 mm and 10 mm. The screen may comprise open areas that are free from strips to reduce heat build-up under the screen.

At least some of the strips of film material, preferably more than 10%, 20%, 30%, 40%, 50%, 60%, 70%, 80%, 90%, but most preferably all strips in the screen comprise a film material in the form of a single- or multilayer polyethylene (PE) film as described herein. The polymer used in the single- or multilayer film is polyethylene (PE) also named polyethene (IUPAC). There are several advantages in using polyethylene as the major component of the greenhouse screen, as it is cheaper than polyester which is a component often used in greenhouse films as well as the fact that it can easily be produced in small batches. Polyethylene is classified by its density and branching, and polyethylene is usually a mixture of similar polymers of ethylene. The polyethylene described herein is polyethylene or a co-polymer of polyethylene wherein said co-polymer of polyethylene is prepared from ethane and at least one of the following olefins such as 1-butene, 1-hexene, and 1-octene, the like, and mixtures thereof.

High density polyethylene (HDPE), medium-density polyethylene (MDPE), low-density polyethylene (LDPE), and linear low density polyethylene (LLDPE), or a mixture thereof, are all polyethylenes that may be used in the manufacturing of the films used for the screens in the present invention.

The major component in the film used for the greenhouse screen is a high density polyethylene (HDPE) resin. HDPE is defined by a density of greater or equal to 0.941 to about 0.970 g/cm$^3$. HDPE has a low degree of branching. The mostly linear molecules pack together well, so intermolecular forces are stronger than in highly branched polymers. Consequently a film made from HDPE has high tensile strength, high elongation at break and low tendency to fibrillation. Advantageously, a HDPE for film or tape stretching is used.

The film also includes a certain amount of low-density polyethylene (LDPE) or linear low density polyethylene (LLDPE).

LDPE and LLDPE have unique rheological or melt flow properties but one important purpose of using LDPE or LLDPP is as carriers of additives such as $SiO_2$ particles, UV stabilizers or other additives used in the film.

The main purpose of the greenhouse screen as disclosed herein is to scatter the incident sunlight to create a more homogeneous light distribution inside the greenhouse and a milder climate for the plants. Scattering of light does not necessarily remove the light from the system but instead redirects the light out of the film to the interior of the greenhouse with its original color and intensity. Light scattering occurs on contact with pigment particles present in the screen.

The single- or multilayer polyethylene (PE) film includes, for the purpose of light scattering, silicon dioxide ("light scattering particles"). The single- or multilayer polyethylene (PE) film comprises at least 1.7 wt.-% $SiO_2$ and a maximum of 4.5 wt.-% $SiO_2$. The multi-layered film comprises at least 1.7 wt.-%, such as at least 1.8 wt.-%, 1.9 wt.-%, 2.0 wt.-%, 2.1 wt.-%, 2.2 wt.-%, 2.3 wt.-%, 2.4 wt.-% and ideally at least 2.5 wt.-%-$SiO_2$ or more, based on the total weight of the film, but should advantageously not include more than 4.4 wt.-%, 4.3 wt.-%, 4.2 wt.-%, 4.1 wt.-%, 4.0 wt.-%, 3.9 wt.-%, 3.8 wt.-%, 3.7 wt.-%, 3.6 wt.-%, and ideally 3.5 wt.-% $SiO_2$ or less. If the content of the particles is too low, the light diffusing effect becomes too low. If the content is too high, the transparency decreases.

Polyester is as mentioned above, a commonly used ingredient for making greenhouse screens. However, a screen manufactured with polyethylene may attain a higher light transmission compared to a polyester screen with the same concentration of silicon dioxide, which is a great advantage for screens with low shade level requirements as the polyethylene makes it possible to combine very high light transmission with good spreading of light (light diffusion).

The scattering of light is very much dependent on the size of particles providing the scattering effect. The $SiO_2$ particles used for the purpose light scattering in the greenhouse screen as disclosed herein have a mass-median-diameter ($D_{50}$) value of 2-10 micrometers, such as 3-9 micrometers, 4-8 micrometers, and ideally a $D_{50}$ value of 5-7 micrometers. Advantageously the $SiO_2$ particles used herein have a $D_{50}$ value of above 2, 2.5, 3, 3.5, 4, 4.5 and preferably at least 5 micrometers or above, but advantageously the $D_{50}$ value of the $SiO_2$ particles is below 10, 9.5, 9, 8.5, 8, 7.5, and preferably 7 micrometers or below.

The term "Mass-median-diameter (MMD)" when used herein is intended to mean the log-normal distribution mass median diameter and the MMD is considered to be the average particle diameter by mass, i.e. the diameter of a spherical particle with the median mass of all the particles in a population.

Compared to particles of the aforementioned size ranges, a use of particles with a $D_{50}$ value of less than 2 micrometers results in a lower light scattering angle and a greater transparency, reduction than when the particle content (in wt.-%) corresponds to that of the $SiO_2$ particles in the range mentioned above. Particles with a $D_{50}$ value of greater than micrometers result in the same particle content (in wt.-%) but gives no further improvement in the light-scattering effect, as compared to particles in the desired size range. In addition, large voids (cavities) form around the larger particles and these act by reducing transparency.

Factors Affected by the Light Scattering Effect

The transparency in combination with a suitable scattering behavior is of particular importance when the films are used in greenhouse-screens. As a rule, a particularly high transparency is desired to supply the plants with as much light as possible. However, in regions with very warm climates also a reduction in the amount of light may be desirable, in particular around the two hours of sun peaking. The inventive film suitable for screens in these climate zones should have a transparency which is between 70 and 95%. For temperate climates (e.g. Europe, North America, Japan) the transparency of the film of the invention is advantageously at least 80% and especially at least 83%. The greenhouse film described herein has a transparency of at least 70%, such as at least 75%, 80%, 85%, 86%, 87%, 88%, 89%, 90%, 91%, 92%, 93% or higher.

In addition to the transparency, the three parameters haze, clarity and the spreading factor (SF) are essential in order to provide a film with appropriate scattering properties, The first essential parameter is the haze. The haze should be 50-75%, such as 54-70%, such as 57-67%. Advantageously the haze is above 50%, 51%, 53%, 54%, 55%, 56%, and preferably at least 57% or above, but advantageously the haze is below 75%, 74%, 73%, 72%, 71%, 70%, 69%, 68%, and preferably 67%, or below.

Transparency depends on the linearity of the passage of light rays through the material. Small deflections of the light, caused by scattering centers in the material, bring about a deterioration of the image. These deflections are much smaller than those registered in haze measurements. While haze measurements depend upon wide-angle scattering, clarity is determined by small-angle scattering. The second parameter is therefore the clarity of the film, which should be 15-50%, preferably between 18% and 47%, such as between 21% and 45% and ideally between 24% and 41%. Advantageously the clarity is above 15%, 16%, 17%, 18%, 19%, 20%, 21%, 22%, 23%, and preferably at least 24% or above, but advantageously the clarity is below 50%, 49%, 48%, 47%, 46%, 45%, 44%, 43%, 42% and preferably 41%, or below.

Wide and small angle scattering are not directly related to each other, which means that haze measurements cannot necessarily provide information about the clarity of the specimen and vice versa. However, the following relationship generally holds: If the haze is too high, or the clarity is too low, the light becomes too dispersed. Due to a strong backscatter caused by particles the high transparency values can no longer be achieved, and especially due to the high proportion of scattered light, too much light is lost in the environment of the greenhouse without reaching the plants. Then the ultimate goal by using light scattering films, namely the illumination of lower parts of plants cannot be achieved as the upper regions of the plants absorb the light and shade the lower portions of the neighboring plants. If the haze is too low, the light is not sufficiently diversified and the upper regions of the plant receive too much light.

Besides transparency, haze and clarity, also the spreading factor (SF) must be considered. The spreading factor is the ratio of transparency measured according to ASTM D 1003-61 (Method A), and transparency as measured by the Clarityport (for details see measurement methods):

$$SF = \text{transparency according to ASTM D 1003-61 (Method A)/transparency measured by Clarityport}$$

For optimal light scattering, the spreading factor SF should be between 1 and 8, preferably between 1.5 and 7, such as between 1.8 and 6, such as between 1.9 and 5 and ideally between 2 and 4. Advantageously the spreading factor SF is above 1.0, 1.1, 1.2, 1.3, 1.4, 1.5, 1.6, 1.7, 1.8, 1.9, and preferably at least 2.0, or above, but advantageously the spreading factor SF is below 8, 7.5, 7, 6.5, 6, 5.5, 5, 4.5, and preferably 4, or below.

If the spreading factor is too low, too much un-scattered light passes through the film at the given transparency. The light is not sufficiently diversified and the upper regions of the plant throw a drop shadow to lower parts. The upper leaves receive too much light and photosynthetic activity decreases by excessive heating, while the lower leaves do not get enough light for maximum photosynthetic activity. Within the above limits, the mean scattering angle must therefore be optimized for optimum illumination of the plants.

If the spreading factor is too high at the set transparency, too much light is lost to the environment of the greenhouse due to the scattering effect. Then the ultimate goal by using light scattering films, namely the illumination of lower parts of plants cannot be achieved as the upper regions of the plants absorb the light and shade the lower portions of the neighboring plants.

The transparency of the film and its scattering behavior (optionally also the distribution of the particles across the layers) is achieved by the careful selection of polymers described in the preparation process below, and optionally, by the addition of light scattering particles of suitable particle size as well as particle content.

Advantageously the film has a total thickness of at least 10 micrometers and at the most 70 micrometers. The minimum thickness of the single or multilayer polyethylene film strips is preferably 10 micrometers. Preferably, the thickness of the film is at least 15 and not more than 50 micrometers and ideally at least 20 micrometers and a maximum of 40 micrometers. Advantageously the thickness of the film is above 10, 15, 16, 17, 18, 19, and preferably at least 20 micrometers or above, but advantageously the thickness of the film is below 70, 65, 60, 55, 50, 45, 40, and preferably 35 micrometers or below. If the thickness of the film is below 10 micrometers, the risk of film damages with crack formation during the application in the greenhouse increases and the mechanical strength of the film will no longer be sufficient to accommodate the pulling forces in the screens arising during use. Above 70 micrometers, the film becomes too stiff and difficult to manage. Also the bundle size of the screen tends to increase with increasing film thickness which is a disadvantage during handling and storage of the screen. It is therefore important to produce a film with a thickness within the above disclosed limits.

Furthermore, the scattering process depends on the distance the light has to travel through the film and the likelihood that it will interact with a scattering particle along the path. Thus, at a given concentration of scattering particles in the film, the amount of light passing through the film decreases due to increased likelihood of hitting particles with increasing thickness of the film. As a consequence of this, light hitting the film at an incident angle other than 90° will be scattered more than light hitting the film from a perpendicular direction due to its longer path through the film.

Single-layer film strips consist of only a single layer of film which is also called base layer (B-layer). In a multilayer embodiment, the film comprises the base layer and at least one further layer (e.g. A- and/or C-layer) which, depending on its position in the film, is referred to the intermediate layer, when at least one further layer is located on each of the two surfaces, or the outer layer, when it forms a coating layer of the film.

Polyethylenes are theoretically stable under the effect of UV light due to its stable structure and absence of chromophores. However, during processing it suffers partial oxidation in which carbonyl and hydroxyl groups are formed. It also contains some impurities that may act as photo-absorbing chromophores. It is therefore necessary to protect the greenhouse film against solar radiation and especially against UV radiation. Retardation or protection against photo-degradation can take place by using additives such as UV-stabilizers. The UV-stabilizers are often included in the polymer to provide stability against photo-oxidation to protect the film from UV light damage. The UV-stabilizer is selected from the group consisting of UV absorbers, excited-state quenchers, or Hindered-Amine Light Stabilizers (HALS).

UV-absorbers act by absorbing the harmful UV radiation above 290 nm and prevent it from reaching chromophores present in the chemical structure of PE.

Derivatives of o-hydroxybenzophenone or benzotriazole are examples of UV absorbers.

Nickel excited-state quenchers act by deactivating the excited states of chromophoric groups responsible for photo-initiation by energy transfer. Examples of Ni quenchers are nickel dibutyldithiocarbamate.

Hindered-Amine Light Stabilizers (HALS) are based on bis(2,2,6,6-tetramethyl-4-piperidyl) sebacte and are extremely efficient stabilizers against light-induced degradation of most polymers. HALS do not absorb UV radiation, but act to inhibit degradation of the polymer. They slow down the photochemically initiated degradation reactions, to some extent in a similar way to antioxidants. HALS' high efficiency and longevity are due to a cyclic process wherein the HALS are regenerated rather than consumed during the stabilization process. Because of the regenerative nature of this process, as well as the typically high molecular weights of the stabilizers, hindered amine stabilizers are capable of providing extreme long-term thermal and light stability.

In addition, for greenhouse screen applications it is an advantage if the UV stability of the film is not worsened by pesticides that are frequently applied in greenhouses. Pesticides are typically sulphur or halogen based compounds. In this situation it might be necessary to combine the HALS with an acid scavenger such a metal oxide. Often a stearate is also added as a co-additive as it has a synergistic effect and improves the function of the metal oxide. If better performance is needed, this can typically be achieved by NOR-HALS which is not deactivated by the pesticides. The drawback is that NOR-HALS are quite expensive. Examples of HALS that may be used as UV stabilizer in the film is Flamestab™ NOR 116 available from BASF Schweiz AG or Tinuvin™ NOR 371 from the same company.

Screens in greenhouses can be a potential fire hazard, since a fire starting by for example due to an electrical failure can spread to the entire greenhouse causing huge economic damages. The HALS Flamestab™ NOR 116 may advantageously be complemented by a phosphorus based Flame Retardant (FR). Aflammit® PCO 700, Aflammit® PCO 800 and Aflammit® PCO 900, available from Thor Group Limited, England are flame retardants that exhibit synergistic effects together with Flamestab™ NOR 116.

A Process for Preparation

The transparency of the film and its scattering behavior is achieved by the selection of polymers in the preparation process below, by the addition of suitable particles of a particular size and content, and optionally also the distribution of the particles across the layers.

Film processing comprises the following steps: 1) extrusion of the polymer melt; 2) film solidification by cooling; 3) uniaxial stretch at elevated temperature; 4) heat relaxation or fixation; and 5) final take up of the film.

Extrusion of the polymer melt may occur through an annular die or flat die. If the melt is extruded by means of an annular die, air is used to cool and solidify the film. When a flat die is used for extrusion, the polymer melt may be cooled and solidified by either water immersion or chill-roll treatment. The cutting into film strips is done after film solidification, during the stretching operation or later in the process before the final take-up.

The, $SiO_2$ particles, and UV-stabilizers are advantageously added to the HDPE polymer as concentrated particle-containing or additive-containing master batches in the form of pellets before the actual film extrusion. The master batches containing the $SiO_2$ particles are added to obtain a final concentration of 1.7-4.5 wt.-% of $SiO_2$ particles in the film.

Advantageously also the HALS (e.g. Flamestab™ NOR 116) is added to the extruder as a master batch to obtain a final concentration of 0.2-4.0 wt. % of UV-stabilizer in the final melt.

The master batches containing additives are liquefied and mixed with the HDPE polymer in a mixer and thereafter transferred to the extruder. The melts are formed into flat films either by blown film or cast film processes well known to the skilled person.

Blown film processes include high-stalk and in-pocket processes. In a high-stalk process, the extrudate exits an annular opening in the die in the form of a tubular "stalk" that is inflated a distance (usually the length of the stalk) from the extrusion die. For an in-pocket blown process, the tube is inflated as the tube exits the extrusion die.

Inflation of the tube makes the film dimensions greater and provides orientation of the polymers. The tube passes through zones of cooled air, which solidifies the polymer and controls the crystallization. After the tube is flattened and cooled it can be slit to form a film.

Cast films are extruded through a very thin horizontal slit die (flat die). Thereafter the polymer melt is cooled and solidified by passing the film through a water bath or chill rolls. Fast solidification by water quenching tends to increase the tensile strength of the film compared to a tubular blown film. The film may thereafter be cut into strips before being stretched; alternatively the film is cut during or after stretching as described below.

Film strips may be produced by two different techniques: a) the film may be stretched before slitting the film into strips, or b) the film strips may be stretched after slitting of the film. In the first technique (a) the film is stretched in its entire width by uniaxially orienting the film in the machine direction (MDO). During MDO, the film from the blown-film line or cast film process is heated to an orientation temperature of about 5 to 7 degrees Celsius (° C.) below the melting temperature of the film. The heating is preferably performed utilizing multiple heated rollers. The heated film is fed into a slow drawing roll with a nip roller, which has the same rolling speed as the heated rollers. The film then enters a fast drawing roll. The fast drawing roll has a speed that is 2 to 10 times faster than the slow draw roll, which effectively orients the film on a continuous basis. The oriented film is annealed by holding the film at an elevated temperature for a period of time to allow for stress relaxation. The temperature of the annealing thermal rollers is preferably from about 100 to about 125° C. and the annealing time is from about 1 to about 2 seconds.

When the film is stretched after the film has been slit into strips (technique b), stretching on hot plates may be advantageous compared to stretching in hot air ovens as the heat is transferred to the film by direct contact with the polished steel surface of the stretch plate. The heating of the stretch plate is performed with hot oil circulation. It is important that the temperature is uniformly distributed across the stretch plate to produce even film tapes. At overly high temperatures the film tapes may soften and stick to the metal surface. At an excessively low stretch temperature the film tapes may rupture. A temperature profile with increasing plate temperature in the machine direction provides the best conditions for a smooth stretching process.

A tubular blown film may be stretched in any one of three ways:
1) the tube is slit open after the draw-off nip roll procedure and opened up. The single layered film is cut into strips and the strips are thereafter stretched as described above.
2) the film tube is stretched as a double layer and the cutting is done on the flattened double layer film. The upper layer film strips are stretched on the upper side of a hot plate and the lower layer film strips are stretched on the bottom side of the hot plate.
3) the film is both cut and stretched in double layer The longitudinal (uniaxial) stretching ratio is in the range of 1:3 to 1:10, preferably from 1:4 to 1:8, more preferably from 1:5 to 1:7. Advantageously the stretching ratio is 1:3, 1:4, and preferably at least 1:5, or above, but advantageously the stretching ratio is 1:10, 1:9, 1:8, and preferably 1:7, or below. This means that the film is stretched in the longitudinal direction such that the stretched film has a final thickness that is 3 to 10 times thinner after being stretched than before. A longitudinal stretching ratio higher than 9 or 10 tends to reduce the light scattering effect and should therefore be avoided. A stretch ratio above 10 leads to a significant deterioration in manufacturability (tears). A stretch ratio below 1:3 may result in a "cloudy" film.

The film is then wound up in a customary manner.

Advantageously one or more of said strips of film material has a width that is smaller than the distance between the longitudinal threads.

Advantageously a gap is formed between said one or more strips of film material and the adjacent strip(s), said gap permitting ventilation through said screen.

Advantageously at least 10%, preferably at least 20%, more preferably at least 30%, more preferably at least 40%, more preferably at least 50%, more preferably at least 60%, more preferably at least 70%, more preferably at least 80%, more preferably at least 90% of the strips of film material in the greenhouse screen comprise said single- or multilayer polyethylene film.

Advantageously all strips of film material in the greenhouse screen are of said single- or multilayer polyethylene film.

BRIEF DESCRIPTION OF THE DRAWINGS

The invention will below be described with reference to some embodiments shown in the drawings.

DETAILED DESCRIPTION

Films of the invention are outstandingly suitable as light scattering film, in particular for the production of screens in greenhouses.

The greenhouse screen 10 according to the invention comprises a plurality of narrow strips of film material 11 held together by a yarn framework 12, 13a, 13b; 14, 15; 18, 19. The strips of film material 11 are preferably arranged closely edge to edge, so that they form a substantially continuous surface. In all embodiments the distance between the strips 11 has been exaggerated for the sake of clarity to make the yarn framework visible. The screen has a longitudinal direction, y, and a transverse direction, x, wherein the strips of film material 11 extend in the longitudinal direction. In some embodiments strips of film material 11' may extend also in the transverse direction. A typical width of the strips is between 2 mm and 10 mm.

Figure 1:
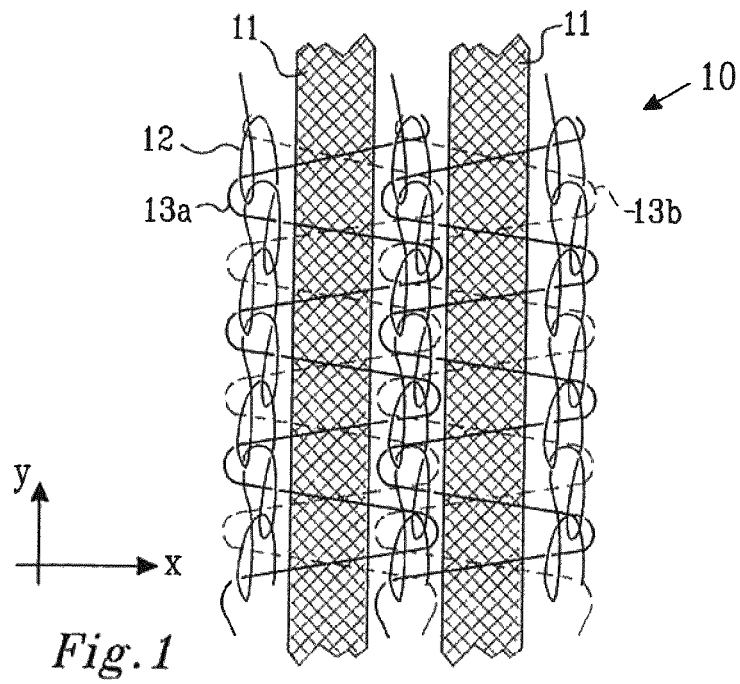
FIG. 1 shows on an enlarged scale part of warp-knitted screen according to a first embodiment.

In FIG. 1 strips of film material 11 are interconnected by a warp knitting procedure as described in EP 0 109 951. The yarn framework comprises warp threads 12 forming loops or stitches and primarily extending in the longitudinal direction, y. The warp threads 12 are connected to one another by weft threads 13a and 13b extending across the film strips.

FIG. 1 shows an example of a mesh pattern for a fabric manufactured through a warp knitting process in which four guide bars are used, one for the strips of film material 11, two for the connecting weft threads 13a and 13b extending transversely to the film strips and one for the longitudinal warp threads 12.

The spaces between the strips of film material 11 have been strongly exaggerated in order to make the mesh pattern clear. Usually the strips of film material 11 are located closely edge to edge. The longitudinal warp threads 12 are arranged on one side of the screen, the underside, while the transverse connecting weft threads 13a and 13b are located on both sides of the fabric, the upper and the underside. The term "transverse" in this respect is not restricted to a direction perpendicular to the longitudinal direction, but means that the connecting weft threads 13a and 13b extends across the strips of film material 11 as illustrated in the drawings. The connection between the longitudinal warp threads 12 and the transverse weft threads 13a and 13b are preferably made on the underside of the fabric. The strips of film material 11 can in this way be arranged closely edge to edge without being restricted by the longitudinal warp threads 12.

The longitudinal warp threads 12 in FIG. 1 extend continuously in unbroken fashion along opposite edges of adjacent strips of film material 11, in a series of knitted stitches, in a so called open pillar stitch formation.

The transverse weft threads 13a and 13b pass above and below the strips of film material 11 at the same location, i.e. opposed to each other, to fixedly trap the strips of film material. Each knitted stitch in the longitudinal warp threads 12 has two such transverse weft threads 13a and 13b engaging with it.

Figure 2:
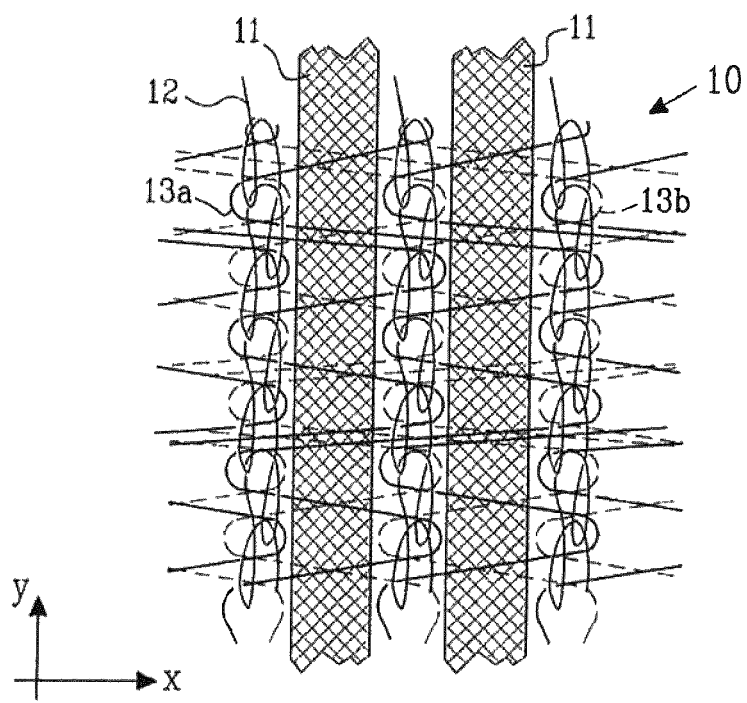
FIG. 2 shows a part of a warp-knitted screen according to a second embodiment.

FIG. 2 shows another example of a mesh pattern for a fabric similar to the one shown in FIG. 1. The difference is that the transverse weft threads 13a and 13b pass over one and two strips of film material 11 in an alternating way.

Figure 3:
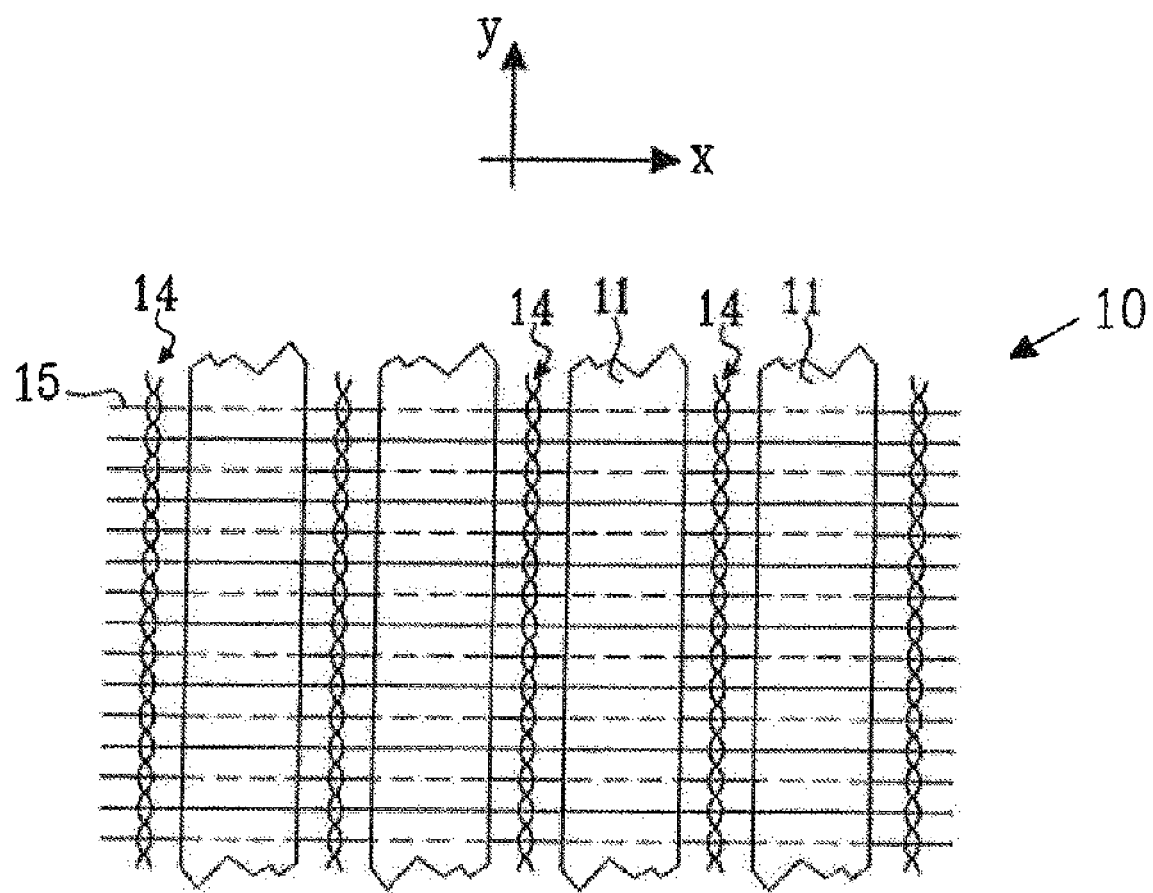
FIG. 3 shows on an enlarged scale a part of a woven screen.

FIG. 3 shows a woven screen in which the strips of film material 11 are interconnected by warp threads 14 extending in longitudinal direction, y, and interwoven with weft threads 15 extending across the strips of film material 11 primarily in the transverse direction, x.

Figure 4:
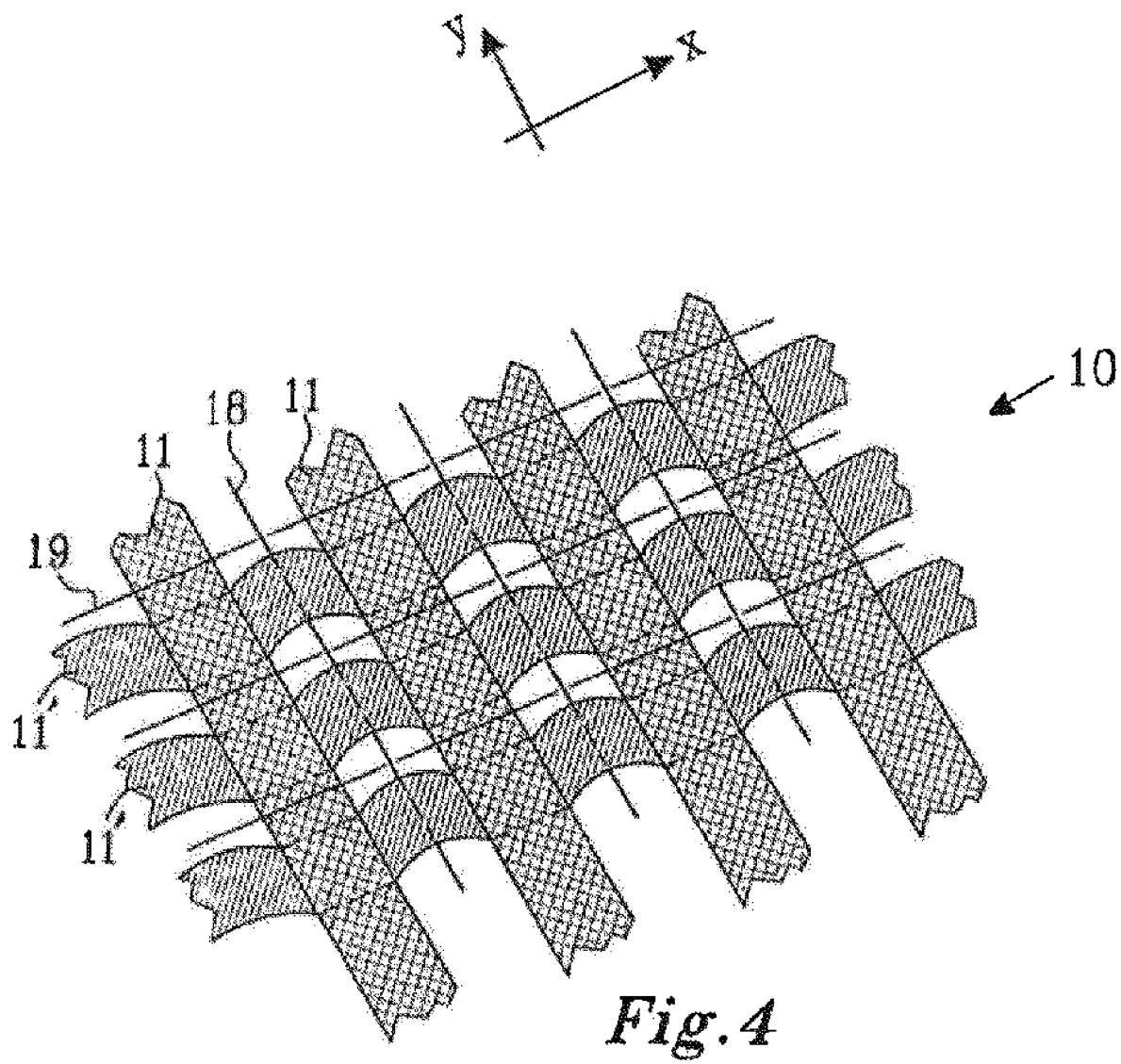
FIG. 4 shows a part of a woven screen according to a further embodiment.

FIG. 4 shows another embodiment of a woven screen as described in U.S. Pat. No. 5,288,545 comprising strips of film material 11 (warp strips) extending in longitudinal direction, y, and strips of film material 11' (weft strips) extending in transverse direction, x. The weft strips 11' in the transverse direction may as shown in FIG. 4 always be on the same side of the warp strips 11 in longitudinal direction or may alternate on the upper and underside of the warp longitudinal strips 11. The warp and weft strips 11 and 11' are held together by a yarn framework comprising longitudinal and transverse threads 18 and 19. The screen may comprise open areas that are free from strips to reduce heat build-up under the screen.

The strips (11) of inventive film can be combined with strips of other films. Such strips may be of materials providing desired heat transporting and shading properties and be of plastic, metal foil or laminates of plastic and metal. It is also possible to make a screen having "open" areas free from strips permitting ventilation through said screen.

In order to provide the desired light scattering properties at least 10%, preferably at least 20%, more preferably at least 30%, more preferably at least 40%, more preferably at least 50%, more preferably at least 60%, more preferably at least 70%, more preferably at least 80%, more preferably at least 90% of the surface area of the screen should be strips (11) of the single or multilayer film according to the invention. According to one embodiment all strips (11) in the screen are of the single or multilayer polyethylene film described herein and the strips (11) are arranged closely edge to edge, so that they form a substantially continuous surface. Alternatively, the film itself is installed in the greenhouse.

In some embodiments the film strips may be interconnected by a yarn framework having liquid-transporting capacity by capillary action. Advantageously the yarn framework is thermally bonded to at least one side of the strips of film material, and wherein also those parts of the yarn framework that are thermally bonded to the strips have liquid-transporting capacity by capillary action. The installations described above result in a reduction of the amount of light hitting the plants and thus lead to cooling during the day. At the same time they distribute the remaining amount of light homogenously due to the high light scattering in space, thereby ensuring a good illumination of all plants and plant parts. During the night these installations lead to a lower heat loss from the greenhouse to the outside.

Polyethylenes

Suitable high density polyethylenes (HDPE) to be used in the film material as described herein include ethylene homopolymer and copolymers of ethylene and alpha-olefins (about 0.1 to about 10 wt. %). Suitable alpha-olefins include 1-butene, 1-hexene, and 1-octene, the like, and mixtures thereof. Advantageously the HDPE has a melt flow rate of 1.6-2.0 g/10 min at 190° C./5.0 kg, and 19-26 g/10 min at 190° C./21.6 kg, preferably the melt flow rate is 1.7-1.9 g/10 min at 190° C./5.0 kg, and 20-25 g/10 min at 190° C./21.6 kg, more preferably the melt flow rate is 1.8 g/10 min at 190° C./5.0 kg, and 21-23 g/10 min at 190° C./21.6 kg (as determined according to ISO 1133-1).

Advantageously the HDPE has a density of 0.940-0.955 g/cm$^3$, preferably a density of 0.943-0.950 g/cm$^3$, and more preferably a density of 0.946-0.948 g/cm$^3$ (ISO 1183-1). Examples of HDPEs to be used are Hostalen ACP 7740 F2 from Lyondellbasell Industries Holdings, B.V.(Melt flow rate of 1.8 g/10 min at 190° C./5.0 kg, and 23 g/10 min at 190° C./21.6 kg (as determined according to ISO 1133-1); Density of 0.948 g/cm$^3$ (ISO 1183-1)) or HDPE Hostalen GF 9045 F from LyondellBasell Industries Holdings, B.V. (Melt flow rate of 1.8 g/10 min at 190° C./5.0 kg, and 21 g/10 min at 190° C./21.6 kg (as determined according to ISO 1133-1); Density of 0.946 g/cm$^3$ (ISO 1183-1)).

The film also includes a certain amount of low-density polyethylene (LDPE) or linear low density polyethylene (LLDPE). LDPE is defined by a density range of 0.910-0.940 g/cm$^3$. LDPE has a high degree of short- and long-chain branching, which means that the chains do not pack into the crystal structure as well. It has, therefore, weaker intermolecular forces than HDPE as the instantaneous-dipole induced-dipole attraction is less. By including a certain amount of LDPE in the single- or multilayer film the ductility of the film is improved.

LLDPE is a substantially linear polymer (polyethylene), with significant numbers of short branches, commonly made by copolymerization of ethylene with longer-chain olefins. Linear low-density polyethylene differs structurally from conventional low-density polyethylene (LDPE) because of the absence of long chain branching. LLDPE is produced at lower temperatures and pressures by copolymerization of ethylene and such higher alpha-olefins as butene, hexene, or octene (about 5 to about 15 wt. %). The copolymerization process produces an LLDPE polymer that has a narrower molecular weight distribution than conventional LDPE and in combination with the linear structure, significantly different rheological properties. The density of LLDPE is within the range of about 0.865 to about 0.925 g/cm$^3$ Examples 1-6

In the examples 1-6 the following polymers and masterbatches are used:

HDPE1:

HDPE Hostalen ACP 7740 F2 (LyondellBasell Industries Holdings, B.V.) having a Melt flow rate of 1.8 g/10 min at 190° C./5.0 kg, and 23 g/10 min at 190° C./21.6 kg (as determined according to ISO 1133-1); Density of 0.948 g/cm3 (ISO 1183-1).

MB3.2:

90 wt.-% LDPE+10 wt.-% SiO$_2$ ($D_{50}$=3.2 μm). Plastron ANT PO 10B, Plastron SAS, 15 Rue des Marguerites, 68920 Wintzenheim, France. The SiO$_2$ was incorporated in the LDPE in a twin-screw extruder.

MB5.8:

80 wt.-% LDPE+20 wt.-% SiO$_2$ ($D_{50}$=5.8 μm). ARGUBLOCK AB 212 LD, ARGUS Additive Plastics GmbH, Oberer Westring 3-7, 33142 Büren, Germany. The SiO$_2$ was incorporated in the LDPE in a twin-screw extruder.

MB16:

90 wt.-% LDPE+10 wt.-% SiO$_2$ ($D_{50}$=16 μm). Plastron ANT PO 10E, Plastron SAS, 15 Rue des Marguerites, 68920 Wintzenheim, France. The SiO$_2$ was incorporated in the LDPE in a twin-screw extruder.

TABLE 1 summarizes the formulations, manufacturing conditions and the resultant film properties.

|  | Ex. Film 1 | Ex. Film 2 | Ex. Film 3 | Ex. Film 4 | Ex. Film 5 | Ex. Film 6 |
| --- | --- | --- | --- | --- | --- | --- |
| Thickness of film (μm) | 30 | 30 | 30 | 30 | 30 | 30 |
| HDPE1 (%) | 90 | 86 | 90 | 86 | 90 | 86 |
| MB3.2 (%) |  |  |  |  | 10 | 14 |
| MB5.8 (%) | 10 | 14 |  |  |  |  |
| MB16 (%) |  |  | 10 | 14 |  |  |
| Stretch ratio | 1:5.8 | 1:5.8 | 1:5.8 | 1:5.8 | 1:5.8 | 1:5.8 |
| Concentration of SiO$_2$ (wt.-%) | 2.0 | 2.8 | 1.0 | 1.4 | 1.0 | 1.4 |
| SiO$_2$ particle size $D_{50}$ (μm) | 5.8 | 5.8 | 16 | 16 | 3.2 | 3.2 |
| Transparency (%) | 93.4 | 86.0 | 93.6 | 93.6 | 95.0 | 95.0 |
| Haze (%) | 52 | 58 | 29 | 33 | 22 | 25 |
| Spreading factor | 1.8 | 3.0 | 1.4 | 1.4 | 1.2 | 1.3 |

Results:

The films containing SiO$_2$ particles with a D$_{50}$ of 5.8 μm gave even and smooth films with good light diffusion properties. No particles were visible in the film and the polymer mix was easily extruded.

The films containing SiO$_2$ particles with a D$_{50}$ of 16 μm produced films with high transparency but particles were visible in the film and the films were not able to diffuse the light well.

The films containing SiO$_2$ particles with a D$_{50}$ of 3.2 μm gave films with high transparency but with bad light diffusion properties. No particles were visible.

Examples 7-18

In the Tests presented below the following polymers and master batches are used:

HDPE2:

HDPE Hostalen GF 9045 F (LyondellBasell Industries Holdings, B.V.) having a Melt flow rate of 1.8 g/10 min at 190° C./5.0 kg, and 21 g/10 min at 190° C./21.6 kg (as determined according to ISO 1133-1); Density of 0.946 g/cm$^3$ (ISO 1183-1).

MB ARX F85 LD:

Master Batch comprising 70 wt.-%+LLDPE+30 wt.-% Flamestab™ NOR 116 (Argus Additive Plastics GmbH)

MB WPT 1181 N:

Master Batch comprising 80 wt.-% LLDPE+20 wt.-% CaCO$_3$ (Walter Kunstoffe GmbH)

ARX 601 AB02LD:

80 wt.-% carrier polymer+20 wt.-% SiO$_2$, the silica particles have a D$_{50}$ of approximately 10 μm (Argus Additive Plastics GmbH). The SiO$_2$ was incorporated in the LDPE in a twin-screw extruder.

ARX V17/848:

80 wt.-% carrier polymer+20 wt.-% SiO$_2$, the silica particles have a D$_{50}$ of approximately 5.8 μm (Argus Additive Plastics GmbH). The SiO$_2$ was incorporated in the LDPE in a twin-screw extruder.

ARX V17/885:

90 wt.-% carrier polymer+10 wt.-% SiO$_2$, the silica particles have a D$_{50}$ of approximately 2.8 μm (Argus Additive Plastics GmbH). The SiO$_2$ was incorporated in the LDPE in a twin-screw extruder.

For Test films 7-18 the extruded melts were formed into flat films the by blown film processes and the stretched in the machine direction using the settings in Table 2.

TABLE 2

| Machine settings during the manufacture of films | |
|---|---|
| Temperature of extruder: | |
| T1 | 190° C. |
| T2 | 200° C. |
| T3 | 210° C. |
| T4 | 210° C. |
| T5 | 210° C. |
| Line speed | 3.3 m/min |
| MDO Temperature during stretching in the Machine Direction: | |
| T1 | 120° C. |
| T2 | 122° C. |
| T3 | 124° C. |
| T4 | 124° C. |
| T5 | 123° C. |
| T6 | 70° C. |
| Line speed of winder | 17.9 m/min |

Table 3 summarizes the formulations and resultant film properties.

TABLE 3

| Film formulations and resulting film properties | | | | | | | | | | | | |
|---|---|---|---|---|---|---|---|---|---|---|---|---|
| | Test film 7 | Test film 8 | Test film 9 | Test film 10 | Test film 11 | Test film 12 | Test film 13 | Test film 14 | Test film 15 | Test film 16 | Test film 17 | Test film 18 |
| Thickness of film (μm) | 30 | 30 | 30 | 30 | 30 | 30 | 30 | 30 | 30 | 30 | 30 | 30 |
| HDPE2 (wt.-%) | 92 | 87 | 82 | 77 | 92 | 87 | 82 | 77 | 92 | 87 | 82 | 77 |
| ARX 601 AB02LD (wt.-%) | 5 | 10 | 15 | 20 | | | | | | | | |
| ARX V17/848 (wt.-%) | | | | | 5 | 10 | 15 | 20 | | | | |
| ARX V17/885 (wt.-%) | | | | | | | | | 10 | 20. | 30 | 40 |
| MB ARX FR85 LD (wt.-%) | 2 | 2 | 2 | 2 | 2 | 2 | 2 | 2 | 2 | 2 | 2 | 2 |
| MB WPT 1181.N (wt.-%) | 1 | 1 | 1 | 1 | 1 | 1 | 1 | 1 | 1 | 1 | 1 | 1 |
| Concentration of SiO$_2$ (wt.-%) | 1 | 2 | 3 | 4 | 1 | 2 | 3 | 4 | 1 | 2 | 3 | 4 |
| SiO$_2$ particle size D$_{50}$ (μm) | 10 | 10 | 10 | 10 | 5.8 | 5.8 | 5.8 | 5.8 | 2.8 | 2.8 | 2.8 | 2.8 |
| Stretching ratio | 1:5.8 | 1:5.8 | 1:5.8 | 1:5.8 | 1:5.8 | 1:5.8 | 1:5.8 | 1:5.8 | 1:5.8 | 1:5.8 | 1:5.8 | 1:5.8 |
| Transparency (%) | 94.3 | 93.2 | 92.7 | 93.0 | 94.5 | 94.2 | 93.8 | 94.0 | 94.8 | 94.7 | 94.7 | 94.7 |
| Transparency at light exit opening (%) | 61.5 | 51.2 | 43.6 | 21.7 | 65.4 | 55.0 | 46.3 | 40.9 | 72.0 | 65.0 | 60.4 | 56.3 |
| Spreading Factor | 1.5 | 1.8 | 2.1 | 4.3 | 1.4 | 1.7 | 2.0 | 2.3 | 1.3 | 1.5 | 1.6 | 1.7 |
| Clarity (%) | 66.5 | 49.4 | 39.5 | 18.7 | 69.5 | 49.4 | 35.2 | 26.6 | 89.3 | 83.2 | 76.0 | 68.7 |
| Haze (%) | 39.2 | 50.6 | 60.5 | 84.3 | 36.0 | 48.6 | 60.8 | 65.2 | 26.9 | 35.4 | 42.2 | 47.7 |

The results presented in Table 3 represent an average of five measurements.

| Test film | Results |
|---|---|
| Test film 7 | Film is diffuse and grainy with visible particles. Film has a "paper-like" feel. |
| Test film 8 | Film is slightly diffuse and grainy with visible particles. Film has a "paper-like" feel. |
| Test film 9 | Film is not homogenous with short visible streaks due to improper mixing and stretching of the film. Film has a "paper-like" feel. |

-continued

| Test film | Results |
|---|---|
| Test film 10 | Lumps are formed and the film cannot be stretched properly. |
| Test film 11 | Film is diffuse but homogenous. |
| Test film 12 | Film is slightly diffuse but homogenous. |
| Test film 13 | Film is transparent and homogenous. |
| Test film 14 | Film is transparent with a few visible streaks. |
| Test film 15 | Film is transparent, but diffuse. Film is not completely homogenous. |
| Test film 16 | Film is transparent, but diffuse. Film is not completely homogenous. |
| Test film 17 | Film is transparent, milky but diffuse. Film is not completely homogenous. |
| Test film 18 | Film is transparent, milky but diffuse. Film is not completely homogenous. |

Analytical Methods

The following analytical methods were used to determine parameters used:

Measurement of the Mean Particle Diameter $D_{50}$

Determination of the average particle size $D_{50}$ was carried out using a Malvern Mastersizer 2000. For this, the particles were dispersed in water and transferred to a cuvette that was analyzed in the meter wherein the size of the particles was determined by laser diffraction. In general, while the detector captures an image intensity of the diffracted laser light from the angle-dependent light intensity using a mathematical correlation function, the particle size distribution is calculated. The particle size-distribution is characterized by two parameters, the median value $D_{50}$ (=measure of location for the average value) and the degree of scatter SPAN98 (=measure of the scatter of the particle diameter). The test procedure was carried out automatically and included the mathematical determination of the $D_{50}$ value.

Transparency

Transparency was measured in accordance with ASTM-D 1003-61 (Method A) by haze-Gard plus from BYK-Gardner GmbH Germany.

Clarity

Determination of the clarity is carried out according to ASTM-D-1003 and by haze-gard plus from BYK-Gardner GmbH (BYK-Gardner GmbH, Lausitzer Strasse 8, 82538 Geretsried, Germany). The light is deflected within a small solid angle, so that the amount of scattered light is concentrated in a narrow lobe. Clarity is measured in an angular range of less than 2.5°. To measure the clarity, the film is applied close to the light exit-opening when taking the measurement. (Image sharpness)

Assessment of Light Scattering Property (Measurement of Scattering Factor SF)

The light scattering properties are of particular importance for the inventive film. The measurement was carried out by means of a "haze-gard plus" transparency/opacity meter from BYK Gardner (BYK-Gardner GmbH, Lausitzer Strasse 8, 82538 Geretsried, Germany). To measure SF, the transparency of the film is measured when it is held by tension in a clamping ring by holding the film flush to the measurement opening used for haze and transparency measurements as described in ASTM D-1003-61 (Method A). Then, the clamped film is held flush against the light exit-opening (as in the Clarity measurement) while transparency is measured again. The light scattering factor SF corresponds to the ratio of these two readings: The Scattering Factor (SF)=transparency (measured according to ASTM D-1003-61 Method A)/transparency measured in front of the light exit opening (i.e. the clarity measurement).

The invention claimed is:

1. A greenhouse screen comprising strips of film material that are interconnected by a yarn system of transverse threads and longitudinal threads by means of knitting, warp-knitting or weaving process to form a continuous product, characterized in that at least some of the strips comprise a single- or multilayer film with a thickness of 20-50 micrometers, said single- or multilayer film comprising polyethylene, 2.0-4.0 wt.-% $SiO_2$ particles by weight, based on the total weight of the single- or multilayer film, said $SiO_2$ particles having a $D_{50}$ of 5-7 micrometers, wherein the polyethylene is the only polymer in the single- or multilayer film, and wherein the single- or multilayer film has a spreading factor from 1.7 to 8 (measured as transparency according to ASTM D 1003-61, Method A/transparency measured by Clarityport).

2. The greenhouse screen according to claim 1, characterized in that said polyethylene is a high-density polyethylene (HDPE) resin.

3. The greenhouse screen according to claim 2, characterized in that said high density polyethylene (HDPE) resin has a melt flow rate of 1.6-2.0 g/10 min at 190° C./5.0 kg, and 19-26 g/10 min at 190° C./21.6 kg (ISO 1133-1), and a density of 0.940-0.955 g/cm³ (ISO 1183-1).

4. The greenhouse screen according to claim 1, characterized in that said single- or multilayer film has a transparency of at least 70%.

5. The greenhouse screen according to claim 1, characterized in that said single- or multilayer film has a haze of 50-75%.

6. The greenhouse screen according to claim 1, characterized in that said single- or multilayer film has a spreading factor (SF) is between 1.7 and 7 (measured as transparency according to ASTM D 1003-61, Method A/transparency measured by Clarityport).

7. The greenhouse screen according to claim 1, characterized in that said single- or multilayer film has a total thickness of 20-45 micrometers.

8. The greenhouse screen according to claim 1, characterized in that said single- or multilayer film further comprises a UV-stabilizer selected from the group consisting of an UV absorber, an excited-state quencher, or a Hindered-Amine Light Stabilizer, or a combination thereof.

9. The greenhouse screen according to claim 8, characterized in that the UV-stabilizer is a Hindered-Amine Light Stabilizer.

10. The greenhouse screen according to claim 8, characterized in that the UV absorber, the excited-state quencher, or the Hindered-Amine Light Stabilizer, or the combination thereof are present in quantities of between 0.2 and 4 wt.-%, based on the weight of the single- or multilayer film.

11. The greenhouse screen according to claim 1, characterized in that the single- or multilayer film is stretched before it is cut into strips.

12. The greenhouse screen according to claim 1, characterized in that the single- or multilayer film is stretched after it has been cut into strips.

13. The greenhouse screen according to claim 1, characterized in that the single- or multilayer film is uniaxially stretched to a ratio of 1:3 to 1:10.

14. The greenhouse screen according to claim 1, characterized in that one or more of said strips of film material has a width that is smaller than the distance between the longitudinal threads.

15. The greenhouse screen according to claim 14, characterized in that a gap is formed between said one or more strips of film material and the adjacent strip(s) of film, said gap permitting ventilation through said screen.

16. The greenhouse screen according to claim 1, characterized in that at least 10% of the strips of film material in the greenhouse screen comprise said single- or multilayer polyethylene film.

17. The greenhouse screen according to claim 1, characterized in that all strips of film material in the greenhouse screen are of said polyethylene film.

18. The greenhouse screen according to claim 1, characterized in that said single- or multilayer film consists of the polyethylene, the $SiO_2$ particles, and an UV-stabilizer.

19. The greenhouse screen according to claim 1, characterized in that said single- or multilayer film consists of the polyethylene and the $SiO_2$ particles.

20. The greenhouse screen according to claim 1, characterized in that the $SiO_2$ particles are the only particles in said single- or multilayer film.

\* \* \* \* \*